United States Patent
Chen et al.

(10) Patent No.: US 11,966,322 B2
(45) Date of Patent: Apr. 23, 2024

(54) PRELOADING DEBUG INFORMATION BASED ON THE INCREMENT OF APPLICATION

(71) Applicant: INTERNATIONAL BUSINESS MACHINES CORPORATION, Armonk, NY (US)

(72) Inventors: Xiao Ling Chen, Beijing (CN); Xiao Xuan Fu, Wuhan (CN); Jiang Yi Liu, Beijing (CN); Zhan Peng Huo, Beijing (CN); Wen Ji Huang, Beijing (CN); Qing Yu Pei, Beijing (CN); Min Cheng, Beijing (CN); Yan Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 17/104,247

(22) Filed: Nov. 25, 2020

(65) Prior Publication Data
US 2022/0164276 A1 May 26, 2022

(51) Int. Cl.
*G06F 11/36* (2006.01)
(52) U.S. Cl.
CPC .............. *G06F 11/3624* (2013.01)
(58) Field of Classification Search
CPC ....... G06F 11/3624; G06F 11/362; G06F 8/54
USPC ......................................................... 717/124
See application file for complete search history.

(56) References Cited

U.S. PATENT DOCUMENTS

| | | | |
|---|---|---|---|
| 5,170,465 A * | 12/1992 | McKeeman et al. | G06F 8/71 717/145 |
| 7,120,675 B1 * | 10/2006 | Shupak et al. | G06F 8/65 717/173 |
| 7,418,697 B2 | 8/2008 | Gryko | |
| 7,467,137 B1 | 12/2008 | Wolfe | |
| 8,434,062 B2 | 4/2013 | Gawor | |
| 8,769,517 B2 | 7/2014 | Baker | |
| 2009/0313597 A1 * | 12/2009 | Rathbone et al. | G06F 8/33 717/100 |
| 2014/0189662 A1 * | 7/2014 | Mameri et al. | G06F 8/40 717/140 |

(Continued)

OTHER PUBLICATIONS

Microsoft, "Debugging with Symbols", Win32 apps | Microsoft Docs, May 31, 2018, pp. 1-7, https://docs.microsoft.com/en-us/windows/win32/dxtecharts/debugging-with-symbols.

(Continued)

*Primary Examiner* — Wei Y Zhen
*Assistant Examiner* — Mohammed N Huda
(74) *Attorney, Agent, or Firm* — Daniel J Blabolil

(57) ABSTRACT

A method, computer program product and system are provided for preloading debug information based on the presence of incremental source code files. Based on parsed input parameters to a source code debugger, a source code repository and a local storage area are searched for an incremental file. In response to the incremental file being located, a preload indicator in the incremental file, which is a source code file, is set. Based on the preload indicator being set, debug symbol data from the incremental file is merged to a preload symbol list. In response to receiving a command to examine the debug symbol data from the incremental file, the preload symbol list is searched for the requested debug symbol data.

17 Claims, 4 Drawing Sheets

(56) References Cited

U.S. PATENT DOCUMENTS

2016/0274998 A1 9/2016 Coyle
2019/0213355 A1* 7/2019 Raviv et al. ........ G06F 11/3624

OTHER PUBLICATIONS

Tasktop, "Incremental Code Coverage as a Debugging Tool", Engineering / Tasktop News, Mar. 12, 2012, pp. 1-4, https://www.tasktop.com/blog/incremental-code-coverage-debugging-tool/.

* cited by examiner

PRELOADING DEBUG INFORMATION BASED ON THE INCREMENT OF APPLICATION

BACKGROUND

Embodiments of the invention generally relate to computer systems, and more specifically to debugging of software files.

Current debugging tools usually provide two modes to load information when debugging an application. In one mode, the debugger loads all source code files, and symbols and addresses are resolved during debugger initialization. Debugger initialization and performance may be impacted when the application is very large.

In the second mode, the debug data is loaded on-demand, and only index information of the source code file names, function and variable names are loaded during debugger initialization. The actual addresses are not resolved until an active set of debug data files are processed at load time. While this improves the initialization time, each breakpoint or function call causes resolution of the addresses for the files and symbols. Therefore, the performance impact is not avoided, but is delayed.

It would be advantageous to provide a debugger for large applications that provides improved performance.

SUMMARY

A method, computer program product and system are provided for preloading debug information based on the presence of incremental source code files. Based on parsed input parameters to a source code debugger, a source code repository and a local storage area are searched for an incremental file. In response to the incremental file being located, a preload indicator in the incremental file, which is a source code file, is set. Based on the preload indicator being set, debug symbol data from the incremental file is merged to a preload symbol list. In response to receiving a command to examine the debug symbol data from the incremental file, the preload symbol list is searched for the requested debug symbol data.

Embodiments are further directed to computer systems and computer program products having substantially the same features as the above-described computer-implemented method.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

DETAILED DESCRIPTION

Figure 1:
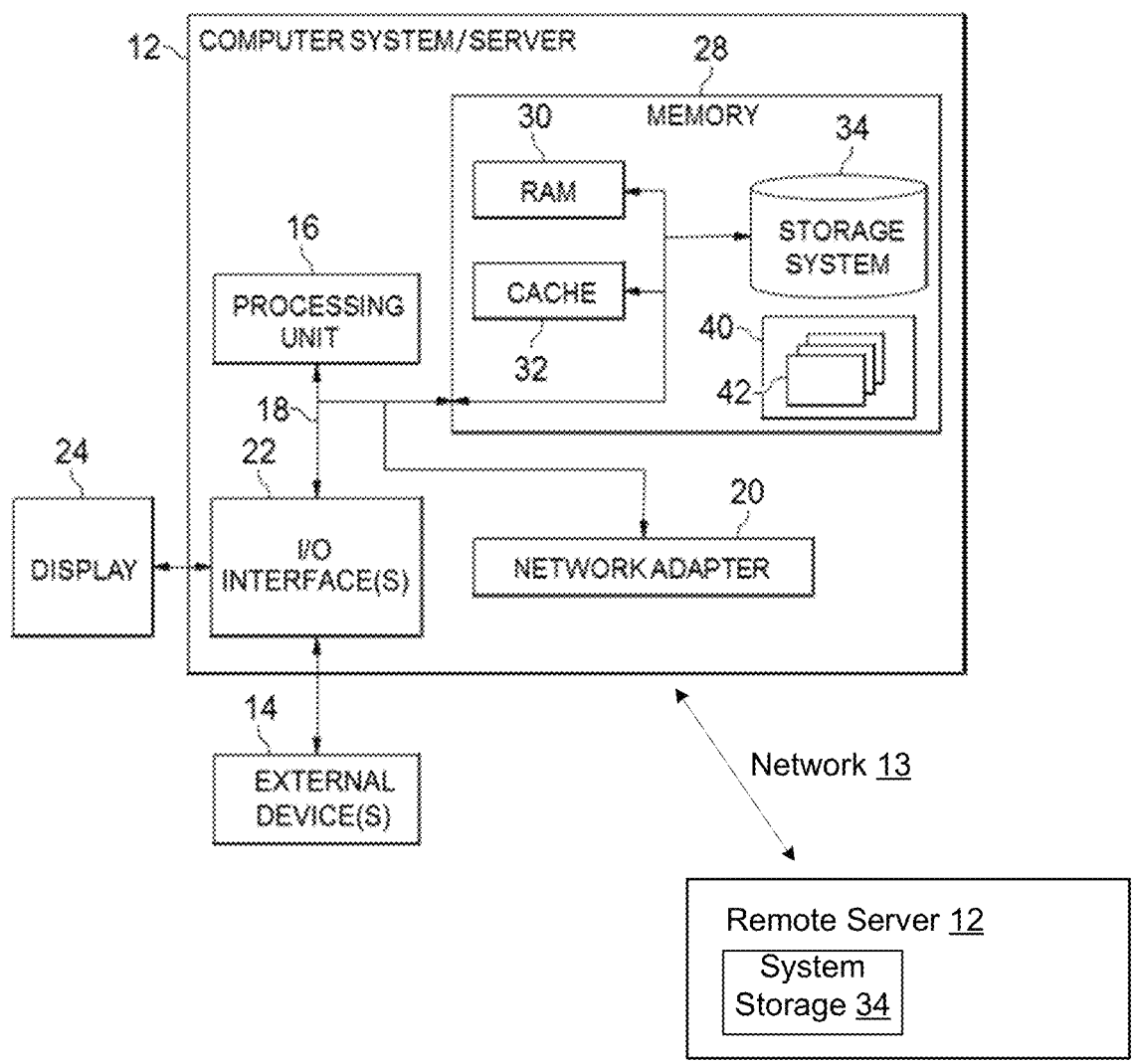
FIG. 1 is a functional block diagram of an illustrative system, according to an embodiment of the present invention.

The present disclosure relates generally to the field of debugging software programs.

Current software debugging tools usually provide two modes to load information when debugging an application. In one mode, referred to as the non-demand load mode, the debugger loads all source code files. All symbols and addresses are resolved during debugger initialization, and the debugger generates a complete symbol table. Debugger initialization performance may be impacted when the application is very large. As an example, an application may include several hundred files, some of which are modified. To maintain software integrity, a change may be included in a separate file, referred to as an incremental file. During the compile process, the incremental files are layered in the order to correctly reflect the changes to the base software file (i.e., initialization overload). Therefore, the resultant load module includes all the base source code files and each of several incremental files.

In the second mode, referred to as the on-demand load mode, the debug data is only loaded on-demand, and only an active set of debug data files is processed at a time. While this mode improves debugger initialization performance, the overall debugger performance for handling breakpoints is still negatively impacted. For example, if an included file "a.h" is called or included in many locations and in many source code files and incremental files, the debugger will load the symbol data from each occurrence. This is needed so that the debugger can resolve each relocation address. Therefore, the performance impact is not avoided, but is delayed.

Embodiments of the present invention are directed to reducing initialization overload and promoting symbol search performance by preloading part of the debug data.

A source code management (SCM) system tracks a history of changes to a code base and helps to resolve conflicts when merging updates from multiple contributors. Source code in the SCM repository is referred to as "checked-in" when a software developer registers modified files as a version in the SCM repository. A software developer still modifying and testing a source code file may want to compile and test the source code file without checking it in. This source code file is referred to as an incremental file. When initializing a debugging session in incremental mode, the debugger marks the incremental file with a preload flag. The debugger may receive the preload flag indicator as a command line option to a compiler, an environment variable in a user's profile, or as a parameter to the debugger. Further, it may be possible to prioritize the debugger parameters, e.g., preload mode, on-demand load, non-demand load.

The debug information, e.g., symbol list, symbol dictionary, is generated by a compiler and represents the relationship between the executable program and the original source code. The symbol list may include a function list, variable type list, variable list, and source file list. In incremental mode, the debugger loads and merges the debug information associated with the flagged incremental file into a preload symbol list. Symbol lists from other parts (other source code files) that are not flagged for preload but that have symbols that are in the flagged incremental file are loaded to a second (other) preload symbol list.

During the debugging session, the debugger searches the preload symbol list, and if not found there, the second preload symbol list is searched for the required symbol information. If the required symbol information is still not found, the debugger performs as in the on-demand mode, and searches the standard symbol list. As a result, the debugger initialization performance tends to improve, as does resolving and searching for symbols during the debugging session.

Embodiments of the invention will now be described in more detail in connection with the Figures.

FIG. 1 is a functional block diagram of an illustrative software debugging system 100, according to an embodiment of the invention.

As shown, the software debugging system 100 includes one or more computer system/servers (server) 12 and remote computer system/servers (remote server) 12. The server 12 may include any computer capable of executing the functions of managing a source code repository, compiling and loading source code files, and executing a debugger.

The functions and processes of server 12 may be described in the context of computer system-executable instructions, such as program modules, routines, objects, data structures, and logic, etc. that perform particular tasks or implement particular abstract data types. The server 12 can be part of a distributed cloud computing environment, where tasks are performed by remote processing devices, such as remote server 12, that are linked through a communications network, such as network 13. In a distributed cloud computing environment, program modules may be located in the system storage of the remote server 12, the storage system 34 of the server 12, or both. Similarly, program modules may be executed on either the server 12, the remote server 12, or both.

As shown in FIG. 1, the server 12 may include, but are not limited to, one or more processors or processing units 16, a system memory 28, and a bus 18 that couples various system components including system memory 28 to processor 16.

Bus 18 represents one or more of several types of bus structures, including a memory bus or memory controller, a peripheral bus, an accelerated graphics port, and a processor or local bus using any of a variety of bus architectures.

The server 12 typically includes a variety of computer system readable media. Such media may be any available media that is accessible by computer system/server 12, and it includes both volatile and non-volatile media, removable and non-removable media.

The memory 28 can include computer system readable media in the form of volatile memory, such as random access memory (RAM) 30 and/or cache memory 32. The server 12 may further include other removable/non-removable, volatile/non-volatile computer system storage media. For example, storage system 34 can include a non-removable, non-volatile magnetic media, e.g., a "hard drive" and an optical disk drive for reading from or writing to a removable, non-volatile optical disk such as a CD-ROM, DVD-ROM or other optical media. Each device in the storage system 34 can be connected to bus 18 by one or more data media interfaces, such as I/O interface 22.

Each program 40 (one of which is shown) represents one of a plurality of programs that are stored in the storage system 34 and are loaded into the memory 28 for execution. A program 40 includes an instance of an operating system, an application, a system utility, a common data provider utility, or similar. Each program 40 includes one or more modules 42. In the present invention, an initialized software debugging environment may be an example of the program 40. The program modules 42 may include source code files loaded into the debugging environment.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via Input/Output (I/O) interfaces 22. The server 12 can communicate with one or more networks, such as network 13, via network adapter 20. As depicted, network adapter 20 communicates with the other components of the server 12 via bus 18. Although not shown, other hardware and/or software components could be used in conjunction with the server 12. Examples, include, but are not limited to: microcode, device drivers, redundant processing units, external disk drive arrays, RAID systems, tape drives, and data archival storage systems, etc.

Figure 2:
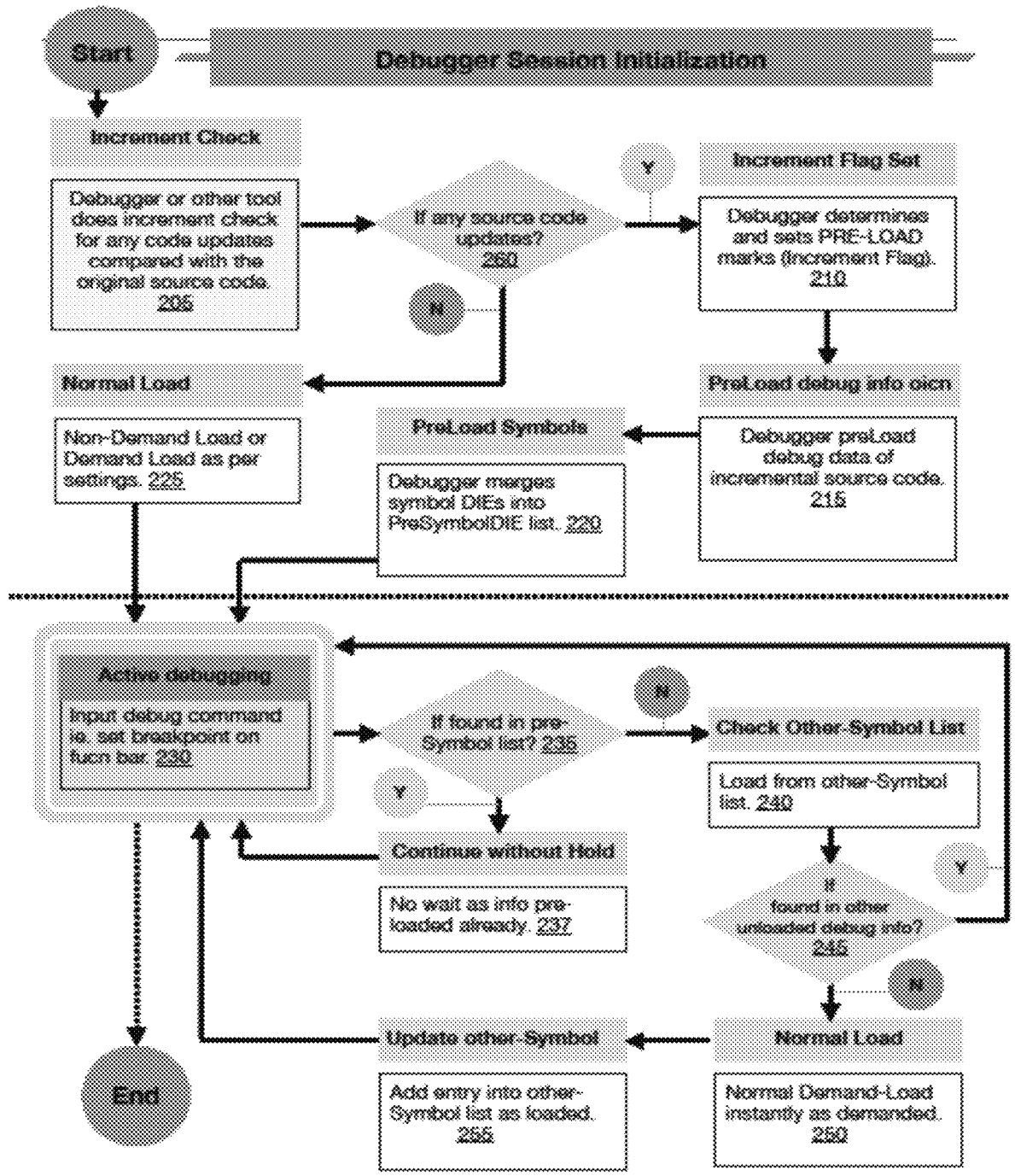
FIG. 2 is a workflow of debugging initialization.

FIG. 2 illustrates a workflow of initializing the software debugging environment.

At 205, the debugger, or a SCM tool checks the source code repository for the existence of the base source code files and any incremental files. A user may also specify an incremental file that is not stored in the source code repository, but is stored locally on the user's computer.

If incremental files are found (260), then at 210, the debugger sets a flag, e.g., a preload flag, indicating the presence of incremental files.

At 215, the debugger loads the debug data of the incremental files that are identified by the preload flag.

If there are no incremental files (260), then the debugger loads symbols depending on parameter settings, i.e., non-demand or on-demand mode (225).

At 220, the debugger merges the debug data into the preload symbol list.

At 230, the debugging session starts, for example by setting one or more breakpoints, or by performing other operations in response to receiving command input.

When the debugger tries to set a breakpoint or view symbol value/type or get the hit breakpoint during the execution of the software being executed in the debugging session, the debugger first searches for the symbols in the preload symbol list. If the symbols are found (235), then at 237, the debugger continues processing any commands for displaying and processing symbols in the preload symbol list.

If the symbols are not found in the preload symbol list (235), then at 240, the debugger searches the second preload symbol list for the symbols. If the symbols are not found in either the preload symbol list or the second preload symbol list (245), the debugger continues as in on-demand mode (250). The debugger adds the symbols from 250 to the second preload symbol list at 255 so that address resolution for these symbols is needed for future references. Processing continues at 230 until the debugging session completes.

Figure 3:
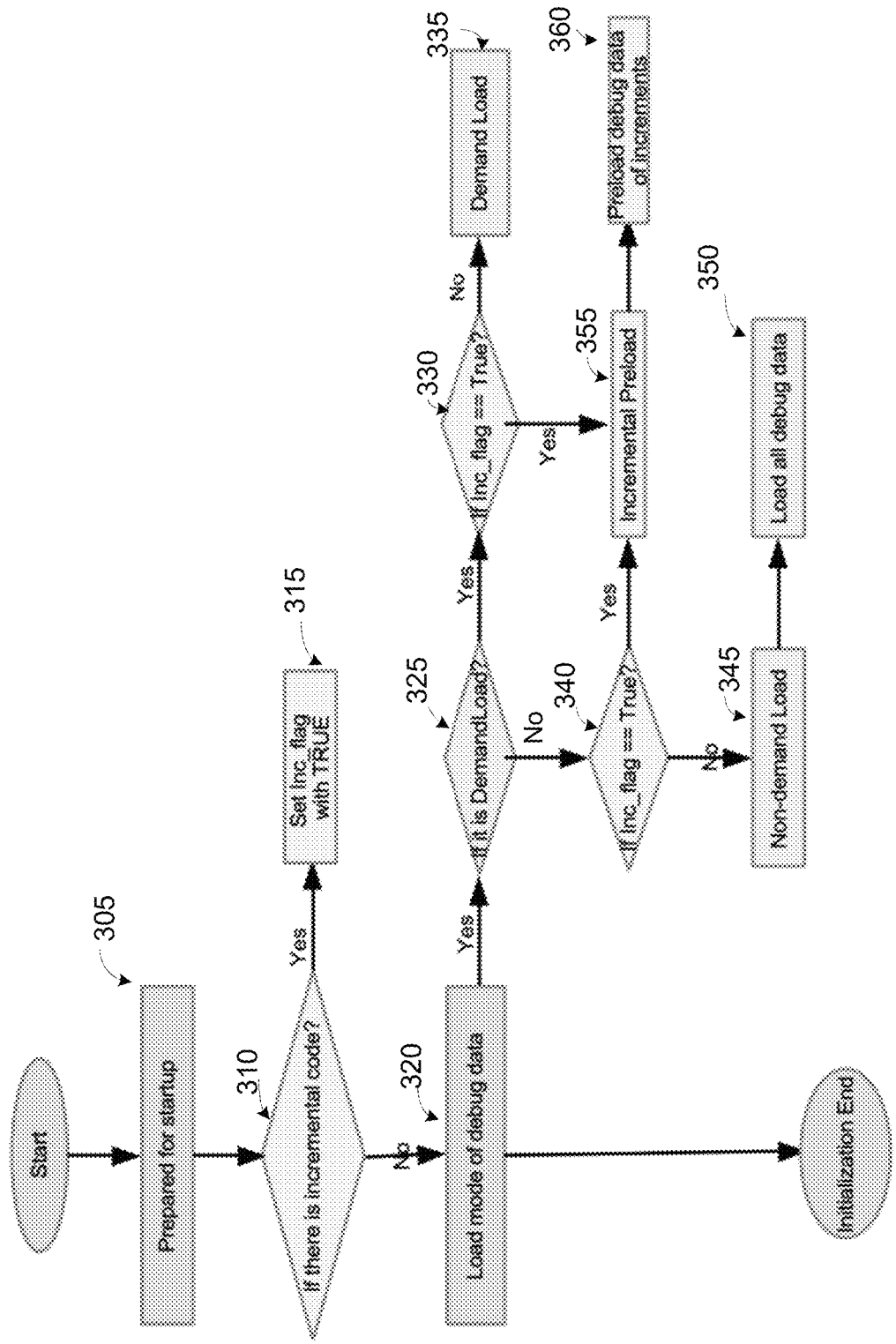
FIG. 3 is a workflow of preloading incremental debug data.

FIG. 3 illustrates a workflow for preloading incremental debug data. This option may be invoked in several ways, such as by setting an environment variable, or a command line option to the compiler or debugger.

At 305, the debugger parses the input parameters to determine the desired behavior of the debugging session, and also to learn the names and locations of the input files.

At 310, the debugger may determine whether the input files include incremental files. This determination may be performed, instead, by another tool, such as the SCM, and if incremental files are found, at 315, the debugger sets an indicator to perform preload (e.g., inc_flag).

At 320, if no incremental files are included in the input, at 325 a check is performed for the execution mode of the debugger.

If at 325 the debugger is in on-demand mode, and the preload flag is not set (330), then the debugger operates in on-demand load mode (335).

If at 325, the debugger is not in on-demand mode and at 340 the preload flag is set, then incremental preload (355) will be performed during the debugging session, and debug data of the incremental files is preloaded to the preload symbol list (360).

If at 325, the debugger is not in on-demand mode, and at 340, the preload flag is not set, then the debugger operates in non-demand mode (345) during the debugging session, meaning that all debug data will be loaded at the initialization of the debugging session (350).

Figure 4:
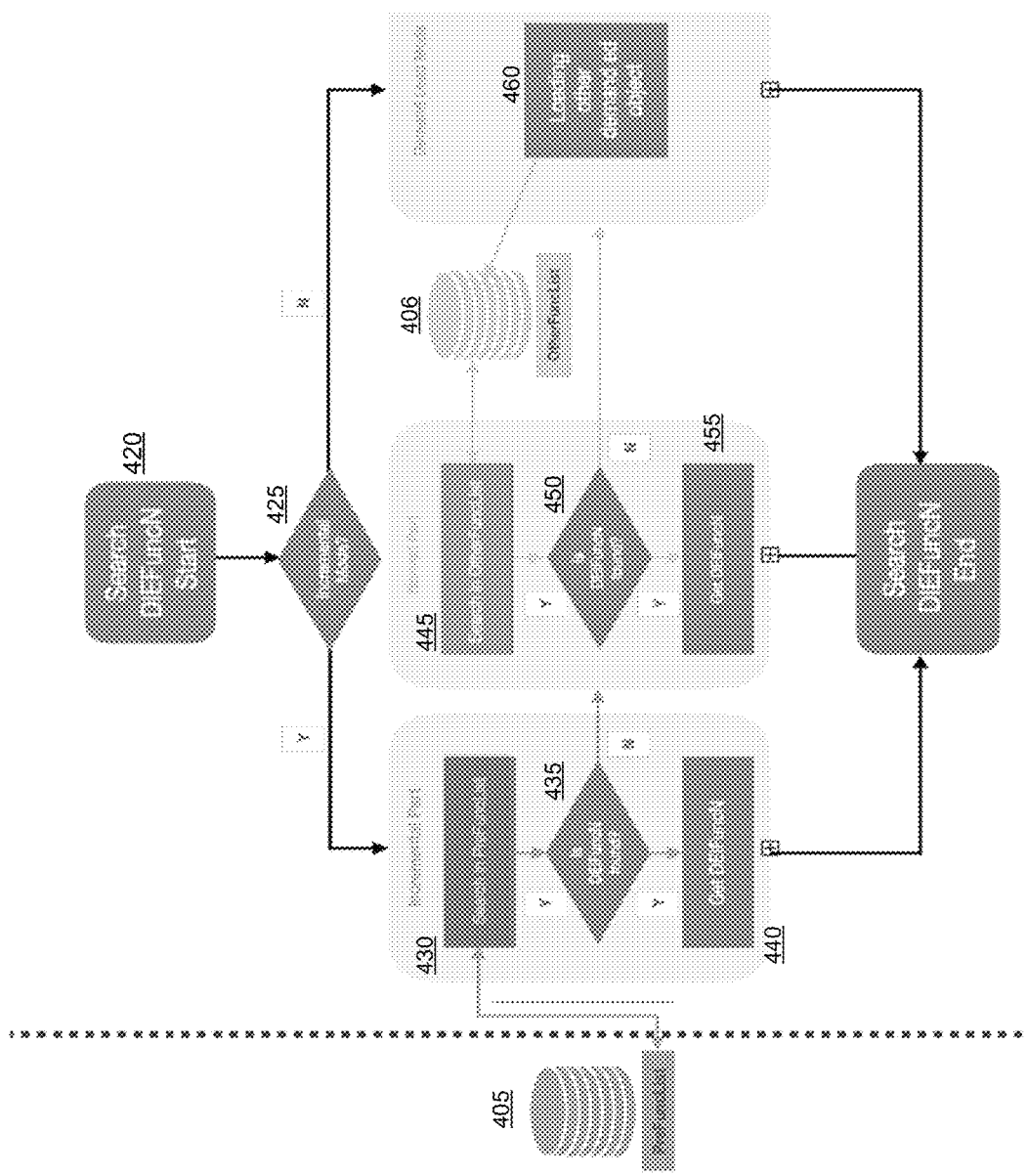
FIG. 4 is a workflow of symbol searching during a debugging session.

FIG. 4 illustrates a workflow of symbol searching during a debugging session.

The object module data is loaded during debugger initialization. Such data includes a map of the object module to show the beginning and ending addresses of modules in the object module. The symbol list for each module in the object module, includes the function list, variable list, the source file list, and the types of each variable.

At 420, the debugger receives a request for a function, e.g., FuncN, for example, as a result of a response to a breakpoint setting.

At 425, if the preload flag is not set, the debugger performs an on-demand mode search for FuncN (460), searching the second preload symbol list (OtherFuncList 406) at 445.

At 425, if the preload flag is set, then at 430, the debugger searches the preload symbol list (PreFuncList 405) for FuncN and its corresponding debug data.

If at 435, FuncN (DEIFuncN) is located in the preload symbol list, then at 440 FuncN and its corresponding debug data is loaded into memory.

If at 435, FuncN is not located in the preload symbol list (405), then at 445, the second preload symbol list (406) is searched.

If at 450, FuncN is not located in the preload symbol list (405) and the second preload symbol list (406), then at 460, the debugger operates in on-demand load mode.

If at 450, FuncN is not located in the preload symbol list (405), but is located in the second preload symbol list (406), then at 455 FuncN and its corresponding debug data is loaded into memory.

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method, comprising:
   marking an incremental file, by a debugger tool, that is not checked into a repository as preload, wherein incremental mode is set by a compiler;
   merging debug symbol data from the preload incremental file to a preload symbol list;
   loading symbol lists from files that are other than the preload incremental file into an other preload symbol list, wherein the files include the debug symbol data that is also included in the preload symbol list;
   in response to receiving a command to examine the debug symbol data from the incremental file, searching the preload symbol list for the requested debug symbol data;
   in response to the requested debug symbol data being not found in the preload symbol list, searching the other preload symbol list; and
   in response to the requested debug symbol data being not found in the preload symbol list and in the other preload symbol list, loading only an active set of debug data on demand when the debug symbol data is not found in the preload symbol list and in the other preload symbol list.

2. The method of claim 1, further comprising:
   based on the preload being set in the incremental file, merging the debug symbol data from other source code files not having the preload set to the preload symbol list, wherein the other source code files include the debug symbol data from the incremental file.

3. The method of claim 1, further comprising:
   in response to a request to examine the debug symbol data from the incremental file having preload set, searching the preload symbol list;
   based on the debug symbol data not being found, searching the other preload symbol list; and
   based on the debug symbol data not being found in either the preload symbol list or the other preload symbol list, the debugger continuing in on-demand mode.

4. The method of claim 1, wherein the debugger resolves requests for symbol debug data in either on-demand mode or in non-demand mode based on the preload not being set.

5. The method of claim 1, wherein based on an input parameter, a debugger mode is set to on-demand mode or non-demand mode when incremental mode is not set.

6. The method of claim 1, wherein the incremental file is a source code file other than the source code file checked in to a source code management system.

7. A computer program product, the computer program product comprising a non-transitory tangible storage device having program code embodied therewith, the program code executable by a processor of a computer to perform a method, the method comprising:
   marking an incremental file, by a debugger tool, that is not checked into a repository as preload, wherein incremental mode is set by a compiler;
   merging debug symbol data from the preload incremental file to a preload symbol list;
   loading symbol lists from files that are other than the preload incremental file into an other preload symbol list, wherein the files include the debug symbol data that is also included in the preload symbol list;
   in response to receiving a command to examine the debug symbol data from the incremental file, searching the preload symbol list for the requested debug symbol data;

in response to the requested debug symbol data being not found in the preload symbol list, searching the other preload symbol list; and in response to the requested debug symbol data being not found in the preload symbol list and in the other preload symbol list, loading only an active set of debug data on demand when the debug symbol data is not found in the preload symbol list and in the other preload symbol list.

8. The computer program product of claim 7, further comprising:

based on the preload being set in the incremental file, merging the debug symbol data from other source code files not having the preload set to the other preload symbol list, wherein the other source code files include the debug symbol data from the incremental file.

9. The computer program product of claim 7, further comprising:

in response to a request to examine the debug symbol data from the incremental file having preload set, searching the preload symbol list;

based on the debug symbol data not being found, searching the other preload symbol list; and based on the debug symbol data not being found in either the preload symbol list or the other preload symbol list, the debugger continuing in on-demand mode.

10. The computer program product of claim 7, wherein the debugger resolves requests for symbol debug data in either on-demand mode or in non-demand mode based on the preload not being set.

11. The computer program product of claim 7, wherein based on an input parameter, a debugger mode is set to on-demand mode or non-demand mode when incremental mode is not set.

12. The computer program product of claim 7, wherein the incremental file is a source code file other than the source code file checked in to a source code management system.

13. A computer system, comprising:

one or more processors;

a memory coupled to at least one of the processors;

a set of computer program instructions stored in the memory and executed by at least one of the processors in order to perform actions of:

marking an incremental file, by a debugger tool, that is not checked into a repository as preload, wherein incremental mode is set by a compiler;

merging debug symbol data from the preload incremental file to a preload symbol list;

loading symbol lists from files that are other than the preload incremental file into an other preload symbol list, wherein the files include the debug symbol data that is also included in the preload symbol list;

in response to receiving a command to examine the debug symbol data from the incremental file, searching the preload symbol list for the requested debug symbol data;

in response to the requested debug symbol data being not found in the preload symbol list, searching the other preload symbol list; and in response to the requested debug symbol data being not found in the preload symbol list and in the other preload symbol list, loading only an active set of debug data on demand when the debug symbol data is not found in the preload symbol list and in the other preload symbol list.

14. The computer system of claim 13, further comprising:

based on the preload being set in the incremental file, merging the debug symbol data from other source code files not having the preload set to the other preload symbol list, wherein the other source code files include debug symbol data from the incremental file.

15. The computer system of claim 13, further comprising:

in response to a request to examine the debug symbol data from the incremental file having preload set, searching the preload symbol list;

based on the debug symbol data not being found, searching the other preload symbol list; and based on the debug symbol data not being found in either the preload symbol list or the other preload symbol list, the debugger continuing in on-demand mode.

16. The computer system of claim 13, wherein the debugger resolves requests for symbol debug data in either on-demand mode or in non-demand mode based on the preload not being set.

17. The computer system of claim 13, wherein based on an input parameter, a debugger mode is set to on-demand mode or non-demand mode when incremental mode is not set.

* * * * *